United States Patent Office 3,846,210
Patented Nov. 5, 1974

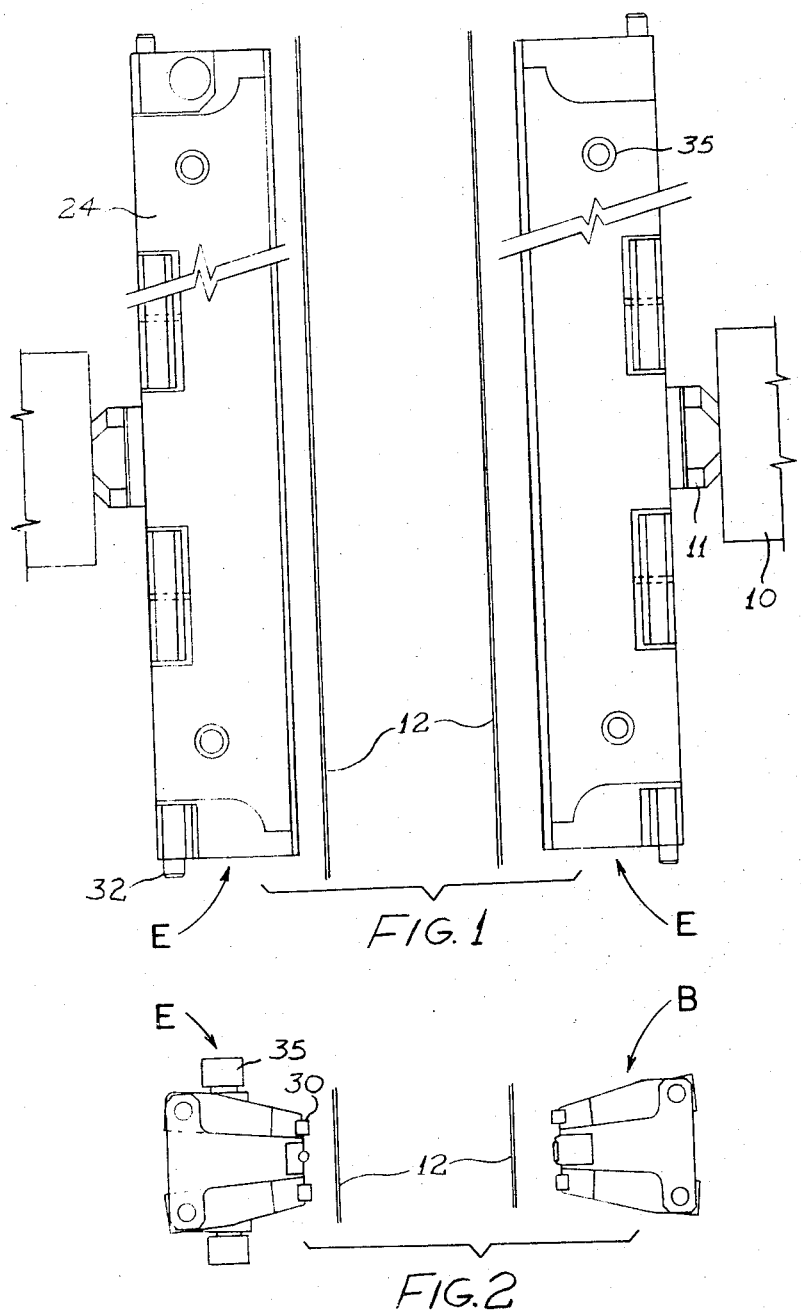

3,846,210
APPARATUS FOR HEAT SEALING
THERMOPLASTIC FILMS
Fergus M. Groundwater, 194 Betourney,
St. Lambert, Quebec, Canada
Original application Feb. 17, 1971, Ser. No. 115,971, now abandoned. Divided and this application Sept. 11, 1972, Ser. No. 287,717
Int. Cl. B30b 15/34
U.S. Cl. 156—583                                   7 Claims

ABSTRACT OF THE DISCLOSURE

An apparatus is described for heat sealing thermoplastic films, comprising a pair of opposed jaws having heat sealing faces. According to the inventive feature, clamping bars are pivotally mounted on each jaw on each side of the heat sealing face with the clamping bars on each jaw having film holding faces adjacent the heat sealing face and pivotal mountings remote from the heat sealing face such that the bars converge toward the heat sealing face. Spring means are provided which tend to force the bars apart against abutments. With this arrangement, as the jaws move toward each other the films are clamped and held between the heat sealing faces as well as between the clamping bar holding faces and as pressure is increased between the jaws, the clamping bar holding faces on each jaw converge toward the heat sealing face and thus move the films toward the heat sealing faces. This has the effect of releasing any tension in the films in the vicinity of the seal.

---

This is a division of application Ser. No. 115,971 filed Feb. 17, 1971, now abandoned.

This invention relates to an apparatus for heat sealing thermoplastic films.

Various sealing devices are presently available for sealing thermoplastic films and thermoplastic coated materials. One such device is the jaw type in which two heated jaws are pressed together with the film layers to be sealed between them. The heat melts the film material and the pressure fuses the layers together. The pressure applied by the jaws tends to squeeze out some molten film with the result that after solidification the film thickness at the edge of the heat seal is reduced. This can be particularly troublesome when the films being sealed are under tension.

Devices have been designed which are intended to overcome these difficulties and one such device is described in Tomson Canadian Pat. 666,648 issued July 9, 1963. With the Tomson arrangement heat and pressure are applied to the layers of film to form a seal and means are provided to move the material on either side of the seal into the molten pool of the seal during the sealing operation. As will be seen from FIGS. 1 to 3 of the patent, this is achieved by curved compression bands 3 which are flattened under compression and then assume their curved shape when compression is released, drawing the film into the seal while assuming the curved shape with the release of pressure. With this arrangement it will be appreciated that any tension in the films being sealed can be released only after the sealing zone itself has become molten.

According to the present invention a sealing device is provided with a more positive action in which the films are firmly compressed together and gripped on each side of the sealing zone before heat is applied with the areas of film on each side of the sealing zone being drawn towards the sealing zone before the heat is applied and sealing takes place. In this way a positive release of any tension in the films in the sealing zone takes place before the heat is applied.

Thus, the apparatus of the invention has a pair of opposed jaws having heat sealing faces adapted to be pressed together. Clamping bars are pivotally mounted on each jaw on each side of the heat sealing face and the clamping bars of each jaw have film holding faces adjacent the heat sealing face. Pivotal mountings for the bars are positioned remote from the heat sealing face such that the bars converge toward the heat sealing face and spring means are provided tending to force the bars apart against retaining abutments. With this arrangement it will be seen that as the jaws move toward each other the films are clamped and held between the heat sealing faces as well as between the clamping bar holding faces and then as pressure is increased between the jaws, the holding faces on each jaw converage toward the heat sealing face and thus move the films toward the heat sealing faces and release any tension therein.

According to a preferred feature, a heating element is provided in only one heat sealing face with the opposed face being in the form of a spring loaded bar which is depressed by the heating element when the jaws close. The heating element is preferably in the form of a rod or tube which is embedded over a portion of its outer surface in an insulating medium. By providing a hollow tubular element it is possible to force a coolant, such as air, down the tube after heat has been applied to promote very rapid cooling. Other coolant passages can be provided in either or both jaws to assist in rapid cooling of the seal.

The film holding faces of the clamping bars preferably includue soft resilient strips to assist in gripping the films without damaging them.

A more detailed description of the preferred embodiment of the invention is set forth below, it being understood that such description is given by way of illustration and explanation only and not by way of limitation, since various changes therein may be made by those skilled in the art without departing from the scope or spirit of the present invention.

In connection with the more detailed description:

FIG. 1 represents a plan view of the sealing jaws in open position;

FIG. 2 is an end elevation of the jaws shown in FIG. 1;

As will be seen from FIGS. 1 and 2, the two main components of the device according to the invention are a first heating jaw E containing a heating element and referred to hereinafter as the "element jaw" and a second sealing jaw B without a heating element and referred to hereinafter as the "backing jaw." These jaws are shown in the retracted position in FIGS. 1 and 2 and are mounted on the piston rods 11 of air cylinders 10. A pair of films 12 to be sealed are shown passing between the jaws E and B.

Figure 3:
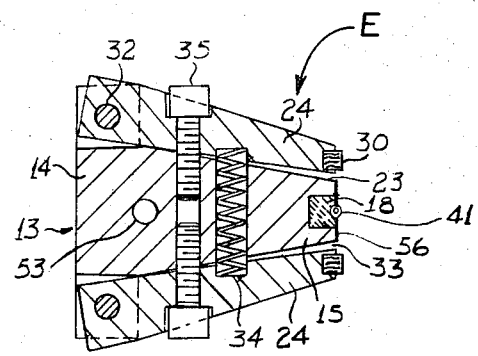
FIG. 3 is a cross-section of a sealing jaw with heating element seated in the insulation with the jaw in open (retracted) position.
Figure 6:
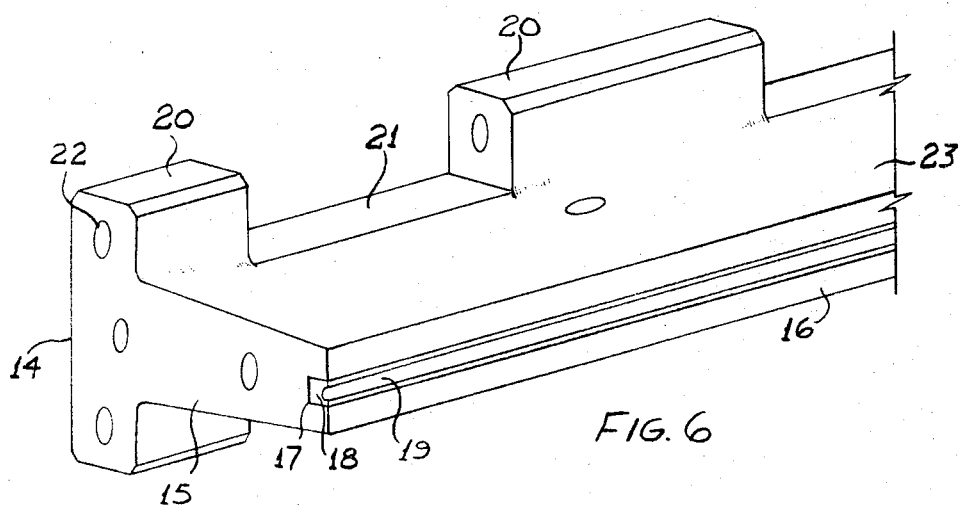
FIG. 6 is an isomeric view showing details of a sealing jaw with heating element.

The structure of the element jaw E can best be seen from FIGS. 3 and 6 and has as a main component a substantially T-shaped aluminium body 13 with a back portion 14 and a forwardly projecting jaw 15 with tapered top and bottom faces 23. The front face 16 of the jaw portion contains a frontal cavity 17 which holds an insulator 18. The insulator 18 is molded or machined so as to have a frontal recess 19 to receive a heating element.

The back portion 14 contains a series of rectangular bosses 20 and rectangular recesses 21 as mounting supports for top and bottom clamping bars. A longitudinal hole 22 passes through the bosses 20.

Figure 8:
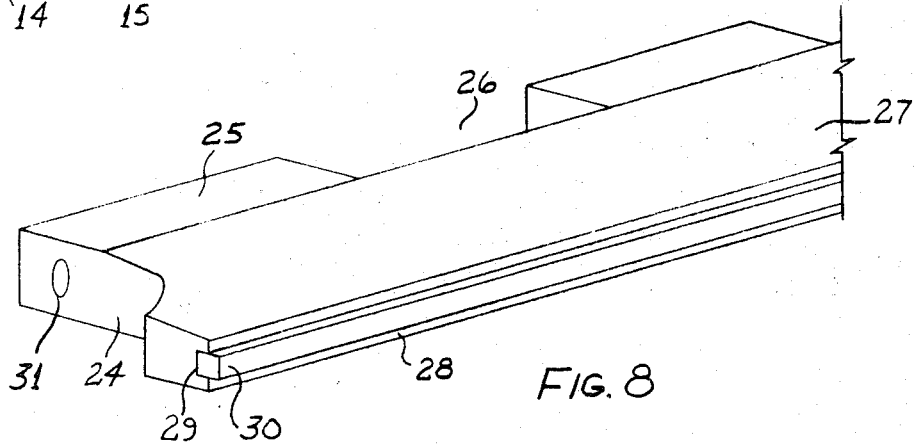
FIG. 8 is an isomeric view showing details of a clamping bar.
Figure 9:
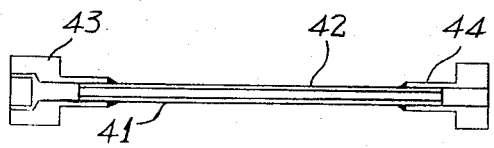
FIG. 9 is a longitudinal section of a heating element.

Details of the clamping bars are shown in FIG. 8 and it will be seen that each clamping bar comprises a body portion 24 with rectangular rear bosses 25 and recesses 26 which mate with the corresponding bosses 20 and recesses 21 of the element jaw E. A longitudinal hole 31 passes through the bosses 25 and this hole 31 aligns with hole 22 of the element jaw. These are held together by pivot shaft 32.

The clamping bar also has tapered faces 27 converging towards frontal face 28. This frontal face includes a rectangular recess 29 within which is positioned a resilient rubber strip 30.

As will best be seen from FIG. 3, the top and bottom clamping bars 24 generally converge adjacent the converging top and bottom faces 23 of the sealing jaw. In FIG. 3 the jaw is in the retracted position so that there is a small gap 33 between the clamping bars 24 and jaw 15.

A series of springs 34 are mounted along the length of the jaw and these springs tend to force the clamping bars 24 apart. They are prevented from being forced apart further than the distance 33 by means of set screws 35. The distance that the clamping bars 24 can be moved apart is controlled by adjustment of these set screws 35.

Figure 4:
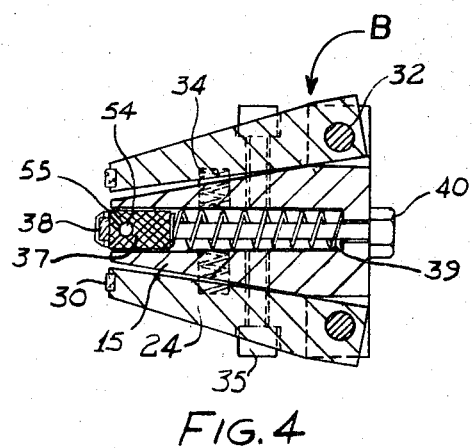
FIG. 4 is a cross-section of an opposed sealing jaw, the compression bar in an extended position with the jaw in open (retracted) position.
Figure 5:
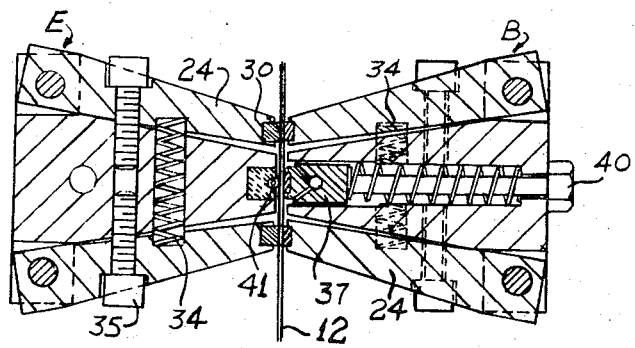
FIG. 5 is a cross-section showing a pair of sealing jaws under full compression.
Figure 7:
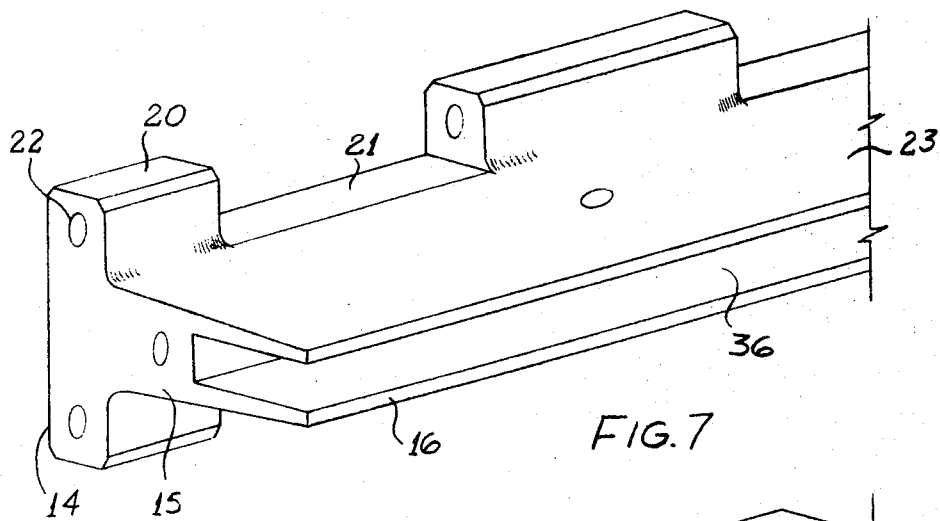
FIG. 7 is an isomeric view showing details of a sealing jaw for holding a compression bar.

Details of the back-up jaw are shown in FIGS. 4 and 7. As with the element jaw E this also has a T-shaped aluminium main body with a back portion 14 and a forwardly extending jaw 15 with converging top and bottom faces 23. The back portion 14 includes rectangular bosses 20, rectangular recesses 21 and longitudinal hole 22 as supports for clamping bars. The frontal face 16 of the jaw portion contains a deep recess 36 which holds a compression bar 37. This bar is machined from a metal and has embedded in its front face a thin strip of resilient material 38, e.g. silicone rubber. This compression bar 37 is forced outward in slot 36 by a series of springs 39 positioned in cavities within jaw portion 15. The compression bar is restrained from moving out of the slot 36 by screws 40 which are placed coaxially with the springs through the rear face of the jaw. These screws also permit adjustment of compression of the springs and thus the force with which the compression bar presses on the heating element when the jaws close.

Figure 10:
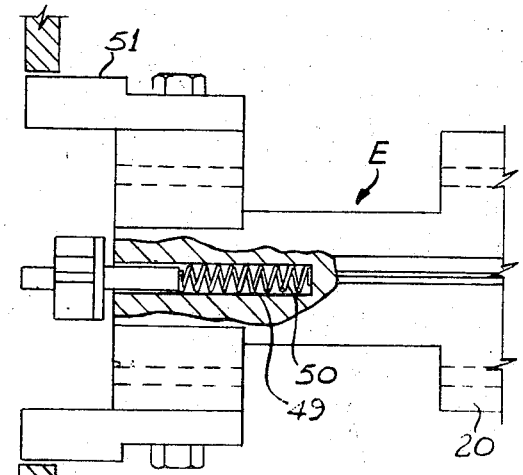
FIG. 10 is a partial sectional view of an end mounting for a sealing jaw.
Figure 11:
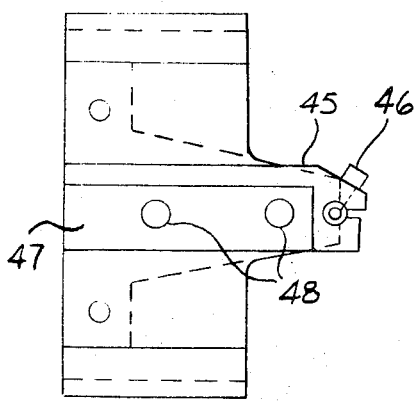
FIG. 11 is an end elevation of the mounting shown in FIG. 10.

The heating element 41 is positioned snugly within recess 19 in insulator 18. The element is preferably hollow with a passageway 42 therein and this permits rapid cooling of the seal after the heating cycle by passing a coolant, such as cool air through the passageway 42 in the element. Other fluids with high heat capacities can also be used to aid in cooling. To facilitate and speed attachment of the element to the element jaw, fittings 43 and 44 are metallically joined to the hollow element tube ends. These fittings accept standard pneumatic tubing connectors. The element with its end fittings is then mounted to the element jaw E so that the element fits snugly in the cavity 19. As will be seen from FIGS. 10 and 11, the end fittings are retained by mounting brackets 45 which can be easily released by loosening one screw 46 at each end. The mounting brackets are in turn mounted to insulating blocks 47 to prevent electrical short circuits to the element bar. These mounting brackets also act as terminals for the incoming power. At one end of the jaw, the insulating block 47 is mounted firmly to the element jaw. At the other end, to allow for terminal expansion of the element, the insulating block is mounted on two dowels 48 which fit into holes 49 recessed into the ends of the main element jaw E. Within these holes are positioned compression springs 50. With the element mounted in the above manner, the insulating block is pressed against the end of the jaw and the dowels compress the spring. The element is then placed in the mounting brackets and tightened down. When the insulating block is released the springs immediately place the element in tension. This removes any bending or bowing tendency in the element which might have been present due to manufacturing imperfections or other causes. As the element heats and expands the two dowels slide outwards driven by the springs so that the element is always under a finite tension. Moreover, this design allows the insulating block to slide outward while always remaining parallel to the end of the element jaw. This avoids putting bending loads and misalignment on the element.

It is important to have the jaws in perfect alignment at all times in order to provide a proper seal and in order to assure that the ends of each of the jaws are at the same level and one does not meet the other at an angle (along its face length), metal bars 51 are mounted to and extend outwardly from each end of each jaw. These bars 51 travel within mating slots 52 of the frame of the assembly which supports the sealing mechanism. The engagement of the bars 51 in the slots 52 assures that each jaw is always parallel to the other jaw in the horizontal plane and that they are at the same elevation to each other.

In order to assure rapid cooling of the seal after the heat is removed, additional cooling means can be provided. This is particularly important in the element bar and to avoid heat build-up in the element bar after repeated sealing cycles, the jaw portion 15 can be provided with inner passageways 53 to which cooling water is pumped. The temperature that the element bar attains is controlled by controlling the amount of water flow.

A second and equally important cooling action can be directed at cooling the seal in the film itself. To facilitate and speed the formation of a seal the compression bar 37 has a cooling passage 54 drilled through it. Cool air and/or water is forced through this passage and at intervals along the passage small bleed holes 55 can be drilled. These holes direct air and water from the main channel to an area adjacent to the seal itself. The amount of cooling obtained is regulated by the amount of air and water flow.

The power for heating is supplied electrically and is allowed to flow after the cylinders have caused the jaws to be firmly seated. As the jaws seat, their travel closes a switch which energizes the element circuit. However, to prevent premature heating of the element before all clamping operations and tension relaxation have been completed, a delay timer can be included in the circuit. This timer can be varied and preset at a delay which will ensure no premature heating.

To prevent a build-up of melted film on the jaws, a strip of very thin protective material 56 can be affixed over the element 41 and insulator 18.

The device operates generally in the following manner:

As the jaws come together the rubber clamping strips 30 first meet each other. As the pressure is increased they clamp the film firmly between them. As the clamping forces continue to increase, because of the converging arrangement of the clamping arms 24, the movements of force about the pivot rod 32 generated by the clamping action on the rubber surfaces 30 overcomes the resisting moments of the forces exerted by the springs 34. Thus, the clamping bars with the film firmly gripped between them pivot inwardly toward the heating element 41. This action effectively relaxes the tension in the film which is trapped between the clamping bars and creates slackness in the film. The adjusting screws can be used to set the clamping bars B for the cycle to obtain greater or less relaxation of the film's tension. By unscrewing them, more pivoting motion can be obtained for the clamping bars and thus more relaxation of the film.

Thus, it will be seen that with the apparatus of this invention, the films are firmly clamped on both sides of the sealing zone, the tension in the film is relaxed by the convergence of the clamping bars, then the heat sealing takes place, the seal is cooled and finally the jaws separate leaving a completed seal in the thermoplastic films.

What we claim is:

1. An apparatus for sealing thermoplastic films, comprising a pair of opposed jaws having heat sealing faces adapted to be pressed together, clamping bars pivotally mounted on each jaw on each side of the heat sealing face, the clamping bars on each jaw having film holding faces adjacent the heat sealing face and pivotal mountings remote from the heat sealing face such that the bars converge toward the heat sealing face and spring means tending to force the bars apart against abutments, whereby as the jaws move toward each other the film is clamped and held between the heat sealing faces as well as between the clamping bar holding faces and as pressure is increased between the jaws, the holding faces on each jaw converge toward the heat sealing face and thus move the film toward the sealing faces.

2. An apparatus according to claim 1 wherein a heating element is provided in one sealing face and the opposite sealing face contains a spring loaded bar which is depressed when pressed by the heating element.

3. An apparatus according to claim 2 wherein the clamping bar holding faces contain projecting resilient strips which contact the films.

4. An apparatus according to claim 2, wherein the heating element is hollow.

5. An apparatus according to claim 1, wherein passageways are provided in the jaws to carry cooling fluids.

6. An apparatus according to claim 1, wherein the heating element is spring loaded in longitudinal tension.

7. An apparatus according to claim 1 wherein the jaws have tapering top and bottom faces converging towards the heat sealing faces and the clamping bars are mounted adjacent these tapered faces.

References Cited

UNITED STATES PATENTS

| | | | |
|---|---|---|---|
| 3,287,199 | 11/1966 | Virta | 156—583 |
| 3,496,049 | 2/1970 | Anderson | 156—497 |
| 3,321,353 | 5/1967 | Zelmick | 156—583 |
| 3,291,963 | 12/1966 | Wetzel | 156—583 |

FOREIGN PATENTS

| | | | |
|---|---|---|---|
| 664,424 | 6/1963 | Canada | 156—515 |

CHARLES E. VAN HORN, Primary Examiner

M. W. BALL, Assistant Examiner

U.S. Cl. X.R.

156—311